US012309280B2

(12) United States Patent
Endo

(10) Patent No.: US 12,309,280 B2
(45) Date of Patent: May 20, 2025

(54) TAMPERING VALIDATION METHOD AND TAMPERING VALIDATION SYSTEM

(71) Applicants: KABUSHIKI KAISHA TOSHIBA, Tokyo (JP); TOSHIBA DIGITAL SOLUTIONS CORPORATION, Kawasaki (JP)

(72) Inventor: Kotaro Endo, Tokyo (JP)

(73) Assignees: KABUSHIKI KAISHA TOSHIBA, Tokyo (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 235 days.

(21) Appl. No.: 17/687,738

(22) Filed: Mar. 7, 2022

(65) Prior Publication Data
US 2022/0191038 A1    Jun. 16, 2022

Related U.S. Application Data

(63) Continuation of application No. PCT/JP2019/041396, filed on Oct. 21, 2019.

(51) Int. Cl.
*G06F 21/00*    (2013.01)
*G06F 21/60*    (2013.01)
*H04L 9/32*    (2006.01)

(52) U.S. Cl.
CPC .......... *H04L 9/3239* (2013.01); *G06F 21/602* (2013.01); *H04L 9/3263* (2013.01)

(58) Field of Classification Search
CPC . H04L 9/3239; H04L 9/3263; H04L 2209/56; H04L 9/50; G06F 21/602; G06F 21/64
See application file for complete search history.

(56) References Cited

U.S. PATENT DOCUMENTS

2003/0084298 A1* 5/2003 Messerges ............ H04L 9/3263
713/176
2017/0346693 A1   11/2017 Dix et al.
(Continued)

FOREIGN PATENT DOCUMENTS

CN        109829076        5/2019
JP        2017-207860      11/2017
(Continued)

OTHER PUBLICATIONS

International Search Report and Written Opinion for International Application Serial No. PCT/JP2019/041396 mailed on Dec. 17, 2019, 7 pages.
(Continued)

*Primary Examiner* — Jeffrey C Pwu
*Assistant Examiner* — Helai Salehi
(74) *Attorney, Agent, or Firm* — Amin, Turocy & Watson, LLP

(57) ABSTRACT

A tampering validation method according to an embodiment includes: calculating a block hash based on other block hashes of a plurality of other blocks and unique information and generating a blockchain to which a block containing the calculated block hash is connected; in response to reception of a validation request for a validation block contained in the blockchain, generating a certificate used for recalculation of recalculation blocks containing block hashes that are dependent on a block hash of the validation block, for the other block hashes; and in response to reception of the certificate, validating the validation block by recalculating block hashes of the recalculation blocks using the certificate.

9 Claims, 13 Drawing Sheets

(56) References Cited

U.S. PATENT DOCUMENTS

| | | | |
|---|---|---|---|
| 2018/0198794 A1* | 7/2018 | Huh | H04L 63/10 |
| 2019/0244227 A1* | 8/2019 | Inoue | H04L 67/1093 |
| 2020/0382283 A1* | 12/2020 | Irazabal | G06F 7/556 |
| 2020/0412549 A1 | 12/2020 | Endo | |
| 2021/0143995 A1* | 5/2021 | Baek | H04L 9/3239 |

FOREIGN PATENT DOCUMENTS

| | | |
|---|---|---|
| JP | 2017-207979 | 11/2017 |
| JP | 2018-196097 | 12/2018 |
| JP | 2019-121947 | 7/2019 |
| WO | 2019/207804 | 10/2019 |

OTHER PUBLICATIONS

Chinese Office Action for Chinese Patent Application No. 201980100214.7 dated May 27, 2024.

* cited by examiner

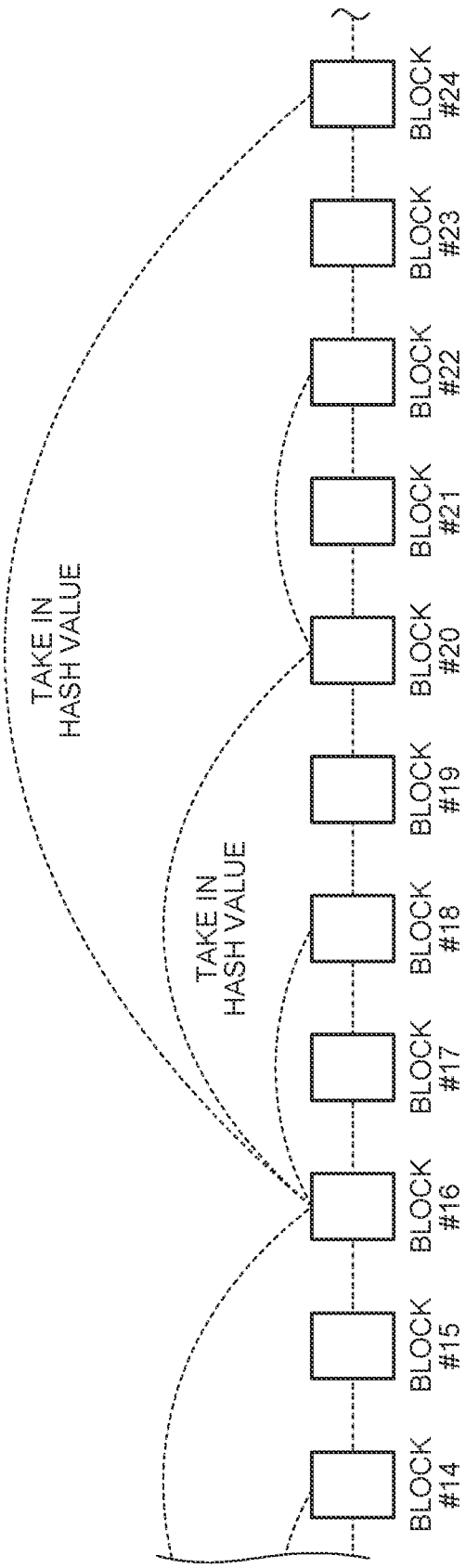

TAMPERING VALIDATION METHOD AND TAMPERING VALIDATION SYSTEM

CROSS-REFERENCE TO RELATED APPLICATIONS

This application is a Continuation of and based upon and claims the benefit of priority from PCT/JP2019/041396, filed on Oct. 21, 2019; the entire contents of which are incorporated herein by reference.

FIELD

Embodiments herein relate to a tampering validation method and a tampering validation system.

BACKGROUND

Cryptocurrencies represented by bitcoins have been put into practical use. Cryptocurrency remittance records are stored in an electronic ledger called a blockchain. In the case of bitcoins, adoption of a method called proof of work makes it difficult to tamper the blockchain. The proof of work is the basis of bitcoin security. Meanwhile recording of general transactions, not limited to remittance, in the electronic ledger has begun, as an application of the blockchain. In addition, as the blockchain, an electronic contract technology called smart contract has also been put into practical use. In the application of the blockchain, a method of maintaining blockchain consistency between a plurality of peers has also been put into practical use by using a general consensus algorithm that does not use the proof of work. Such a blockchain is called a permissioned blockchain.

However, in conventional technology, it has been difficult to reduce a blockchain validation time.

BRIEF DESCRIPTION OF THE DRAWINGS

FIG. 7 is a diagram illustrating a connection example of a blockchain according to a second embodiment.

DETAILED DESCRIPTION

A tampering validation method according to an embodiment includes: calculating a block hash based on other block hashes of a plurality of other blocks and unique information and generating a blockchain to which a block containing the calculated block hash is connected; in response to reception of a validation request for a validation block contained in the blockchain, generating a certificate used for recalculation of recalculation blocks containing block hashes that are dependent on a block hash of the validation block, for the other block hashes; and in response to reception of the certificate, validating the validation block by recalculating block hashes of the recalculation blocks using the certificate.

Embodiments of a tampering validation method and a tampering validation system will be described below in detail with reference to the accompanying drawings.

In a blockchain, in block hash calculation for a certain block, a block hash of a previous block is taken in for calculation. Thus, the hash calculations are linked into a chain, and tamper resistance can be obtained as a whole. For example, if a content of a past block has been tampered with, block hash values are calculated repeatedly in order from the block, making comparisons to determine whether the values match values stored in the blockchain, finding inconsistency when the calculation reaches a block untampered with, and the tampering can be detected.

Incidentally, the permissioned blockchain requires a relatively short time to recalculate the block hashes as compared with a proof of work blockchain, thus making tampering with a block hash in a very long block sequence relatively easy.

Detection of such large-scale tampering with the block hashes requires recalculation of the hash values while tracking the long block sequence, causing a problem that validation takes a long time.

In addition, in order to externally issue a tamper-proof certificate of the past block, it is necessary to save a series of the block hash values as the certificate, but there is also the problem that the data size of the certificate becomes large.

First Embodiment

First, an example of the configuration of a tampering validation system according to a first embodiment will be described.

Example of Configuration

Figure 1:
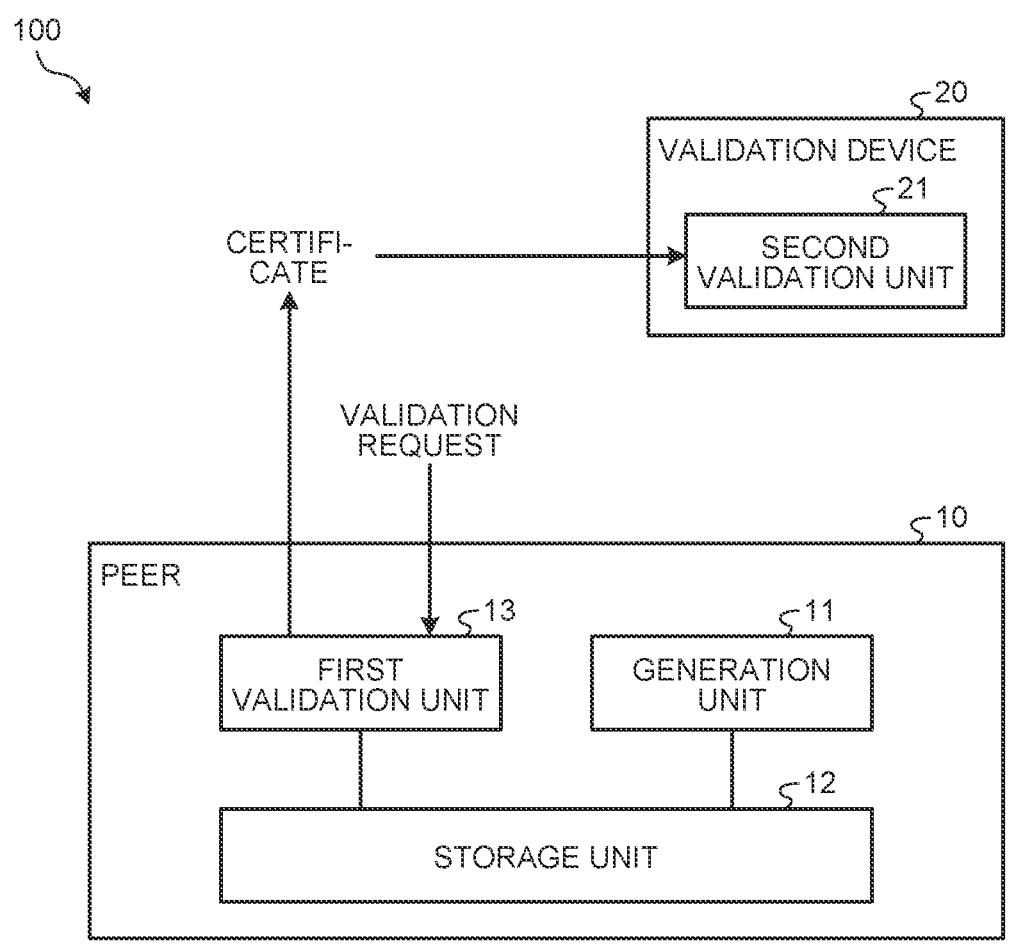
FIG. 1 is a diagram illustrating a configuration example of a tampering validation system according to a first embodiment.

FIG. 1 is a diagram illustrating a configuration example of a tampering validation system 100 according to the first embodiment. The tampering validation system 100 according to the first embodiment includes a peer 10 and a validation device 20. The peer 10 includes a generation unit 11, a storage unit 12, and a first validation unit 13. The validation device 20 includes a second validation unit 21.

The peer 10 is a server device that stores a blockchain. Generally, a plurality of peers 10 is provided, and all the peers 10 store the same blockchain.

The generation unit 11 generates the blockchain. The blockchain is an electronic ledger that contains one or more transaction records. In the first embodiment, a typical bitcoin type blockchain is assumed as the configuration of the blockchain. In other words, a plurality of (may be 0) transaction records (transaction records) is collected in a time series to form blocks. The blocks are assigned with block numbers in ascending order in a time series.

A block hash represents a hash value that is calculated from a data string containing a plurality of transaction records contained in a block. The hash value is a value calculated by a hash function that makes it difficult to perform inverse calculation and has a low probability of hash collision. The block hash is recorded on the blockchain together with the block. The block hash is calculated recursively, and therefore, the transaction records being a calculation target for the block hash are considered to be all transaction records prior to the block. Therefore, for example, when a past transaction record is tampered with, all the block hashes subsequent to the block change.

The block hash can be theoretically recalculated from the transaction records, but for further processing efficiency, the block hash is stored in the storage unit 12 together with the transaction records for each block.

The blockchain according to the first embodiment may be the proof of work blockchain or the permissioned blockchain.

Figure 2:
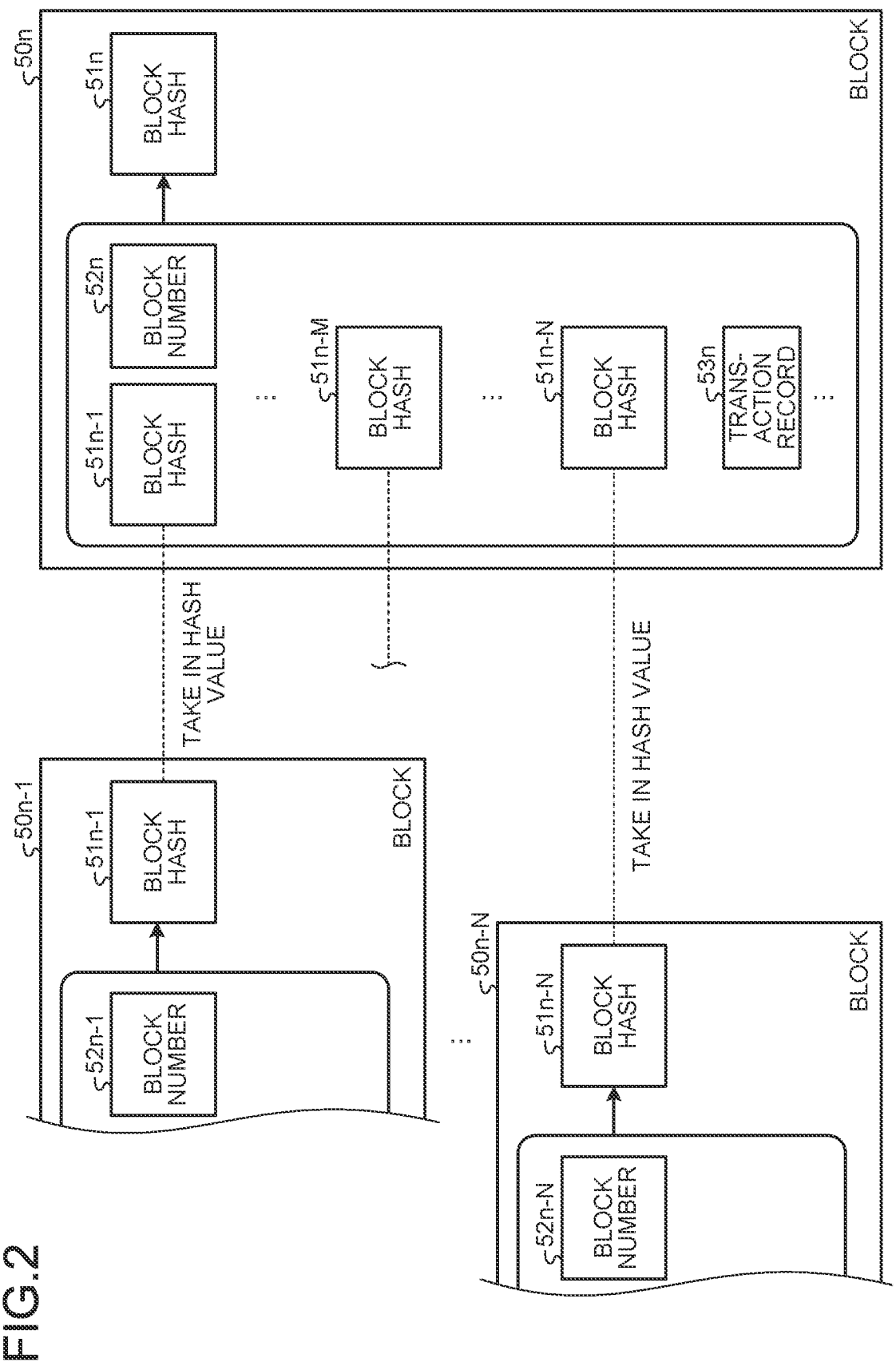
FIG. 2 is a diagram illustrating an example of a blockchain data structure according to the first embodiment.

FIG. 2 is a diagram illustrating an example of a blockchain data structure according to the first embodiment. The blockchain data structure according to the first embodiment is different from a conventional blockchain data structure. For calculation of block hash 51$n$ of block 50$n$ contained in the blockchain according to the first embodiment, not only block hash 51$n$−1 of previous block 50$n$−1 but also block hashes (other block hashes) of a plurality of other blocks not limited to the previous block are used. In the example of FIG. 2, the calculation of block hash 51$n$ uses a plurality of other block hashes (previous block hash 51$n$−1, . . . , block hash 51$n$-M located before the last M block hashes, . . . , block hash 51$n$–N located before the last N block hashes), a block number 52$n$ and a transaction record 53$n$.

The plurality of other block hashes is identified by a set of other block numbers determined on the basis of the block numbers of blocks connected. For example, the plurality of other block hashes is identified by the block numbers contained in a set S(BN) defined as follows.

When BN is an odd number, S(BN)={BN−1}∩N.

When BN is a number that is divisible by 2 but is not divisible by 4, $S(BN)=\{BN-1,BN-2\}\cap N.$ When BN is a number that is divisible by 4 but is not divisible by 8, $S(BN)=\{BN-1,BN-2,BN-4\}\cap N.$ Generally, when BN is an even number and BN is a number that is divisible by $2^n$ but is not divisible by $2^{(n+1)}$, $S(BN)=\{BN-2^m | m$ is an integer satisfying $0 \le m \le n\} \cap N.$ Here, BN represents a block number, and N represents a set of all natural numbers. The block hash of a block having a block number BN is calculated on the basis of other block hashes identified by block numbers b ∈ S(BN) and unique information contained in the block having the block number BN.

Returning to FIG. 1, the generation unit 11 calculates the block hash on the basis of the other block hashes of the plurality of other blocks and the unique information, and generates a blockchain to which the block containing the calculated block hash is connected.

The unique information includes at least one of information based on the transaction records, and the block number BN. Note that the unique information may further include a random character string or the like, for the purpose of reinforcement of tamper resistance.

The information based on the transaction records may be the transaction records themselves or a hash value of the transaction records. Calculation for the block hash by using the hash value of the transaction records eliminates the need for reference to raw transaction contents (transaction records) in recalculation for the block hash, and yields an advantageous effect of heightening non-disclosure. The calculation for the block hash by using the hash value of the transaction records will be described in a fourth embodiment described later.

The storage unit 12 stores the blockchain generated (updated) by the generation unit 11.

When receiving a validation request for a validation block contained in the blockchain, the first validation unit 13 generates a certificate used for recalculation of recalculation blocks containing the block hashes that depend on the block hash of the validation block, for other block hashes used for hash calculation. Note that any device may be used for transmitting the validation request to the peer 10. The first validation unit 13 transmits the certificate to the validation device 20.

The certificate contains, for example, the unique information about the recalculation blocks, the block hashes of the recalculation blocks, and other block hashes used for calculation of the block hashes of the recalculation blocks.

When receiving the certificate from the peer 10, the second validation unit 21 of the validation device 20 recalculates the block hashes of the recalculation blocks by using the certificate to validate the validation block.

Example of Block

Figure 3:
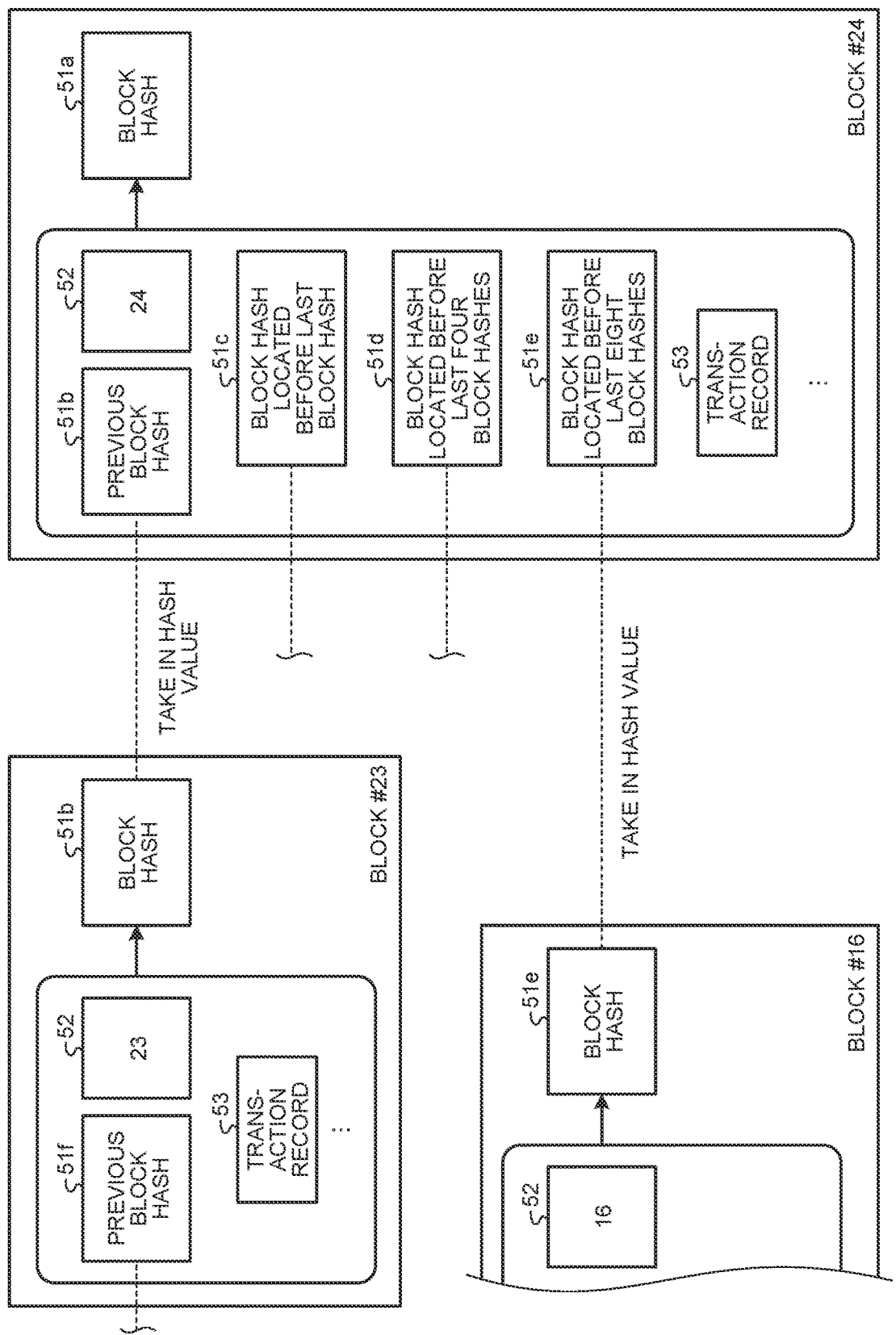
FIG. 3 is a diagram illustrating an example of block #24 according to the first embodiment.

FIG. 3 is a diagram illustrating an example of block #24 according to the first embodiment. Block #24 represents a block having a block number BN 24. The block number BN=24 is divisible by $2^3$ but not divisible by $2^4$, and S(BN=24)={16,20,22,23}. Therefore, calculation of block hash 51$a$ of block #24 uses, as the plurality of other block hashes, previous block hash 51$b$ (BN=23), block hash 51$c$ (BN=22) located before the last block hash, block hash 51$d$ (BN=20) located before the last four block hashes, and block hash 51$e$ (BN=16) located before the last eight block hashes.

Figure 4:
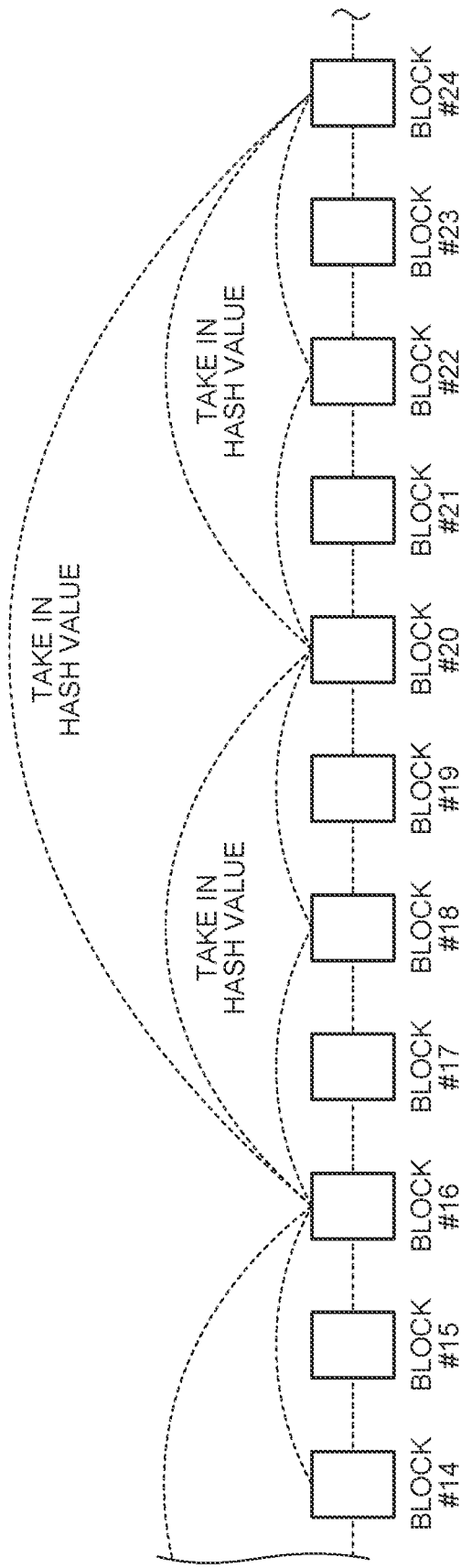
FIG. 4 is a diagram illustrating a connection example of the blockchain according to the first embodiment.

FIG. 4 is a diagram illustrating a connection example of the blockchain according to the first embodiment. For example, block #24 is S(BN=24)={16,20,22,23}, and block #24 is connected to block #16, block #20, block #22, and block #23.

Example of Tampering Validation Method

Figure 5:
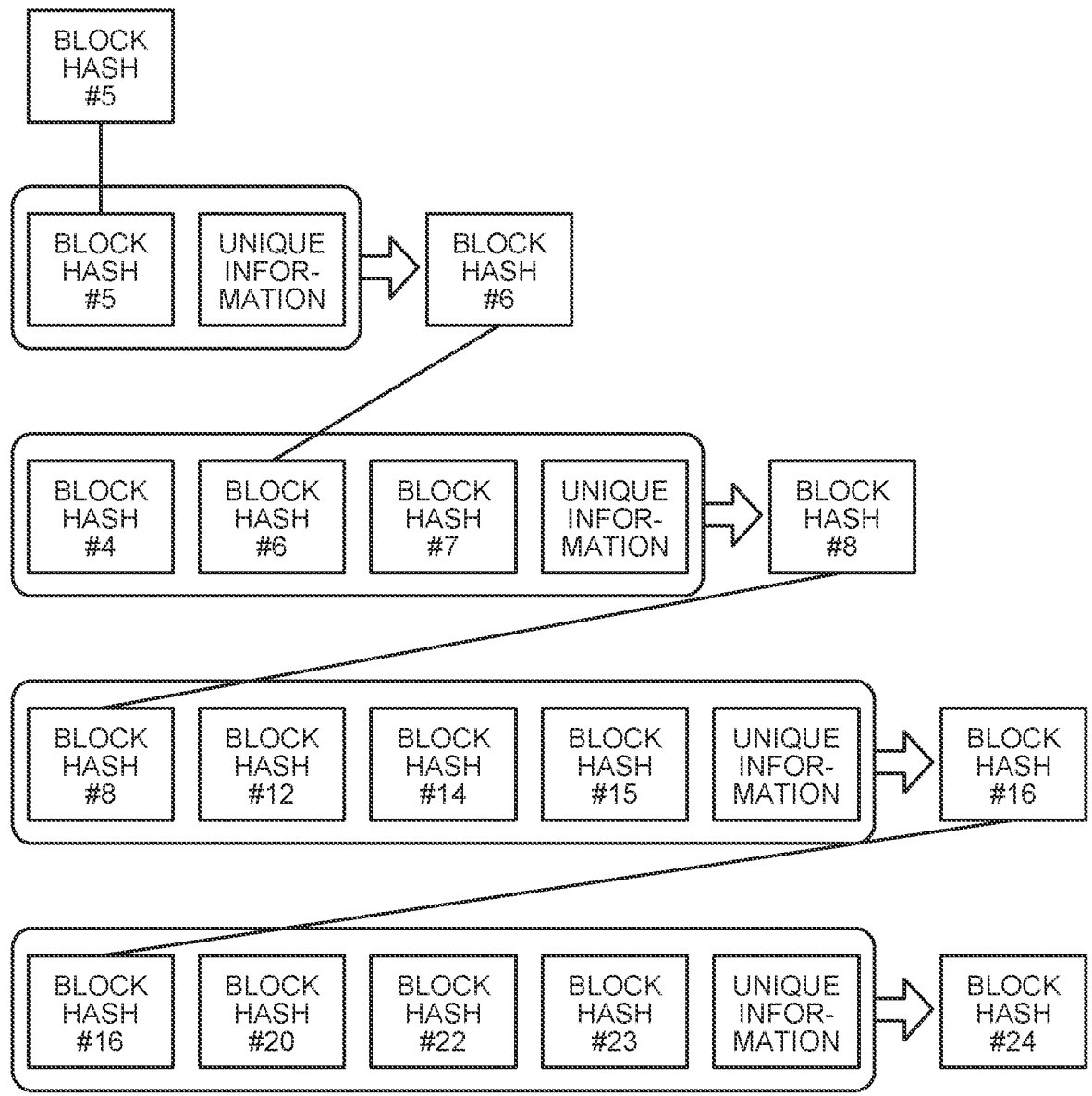
FIG. 5 is a diagram illustrating an example of a tampering validation method according to the first embodiment.

FIG. 5 is a diagram illustrating an example of a tampering validation method according to the first embodiment. The example of FIG. 5 shows selection of block #5 as the validation block in the blockchain up to block #24. In the example in FIG. 5, for validation for non-tempering of block #5, four times of block hash recalculation (block hashes #6,

8, #16, and #24) and reference to 12 other block hashes are performed by the first validation unit 13 and the second validation unit 21.

Furthermore, in the example of FIG. 5, the certificate generated by the first validation unit 13 contains the unique information about the recalculation blocks (blocks #6, #8, #16, and #24), the block hashes (block hashes #6, #8, #16, and #24) of the recalculation blocks, and 12 other block hashes used for calculation of the block hashes of the recalculation blocks.

Figure 6A:
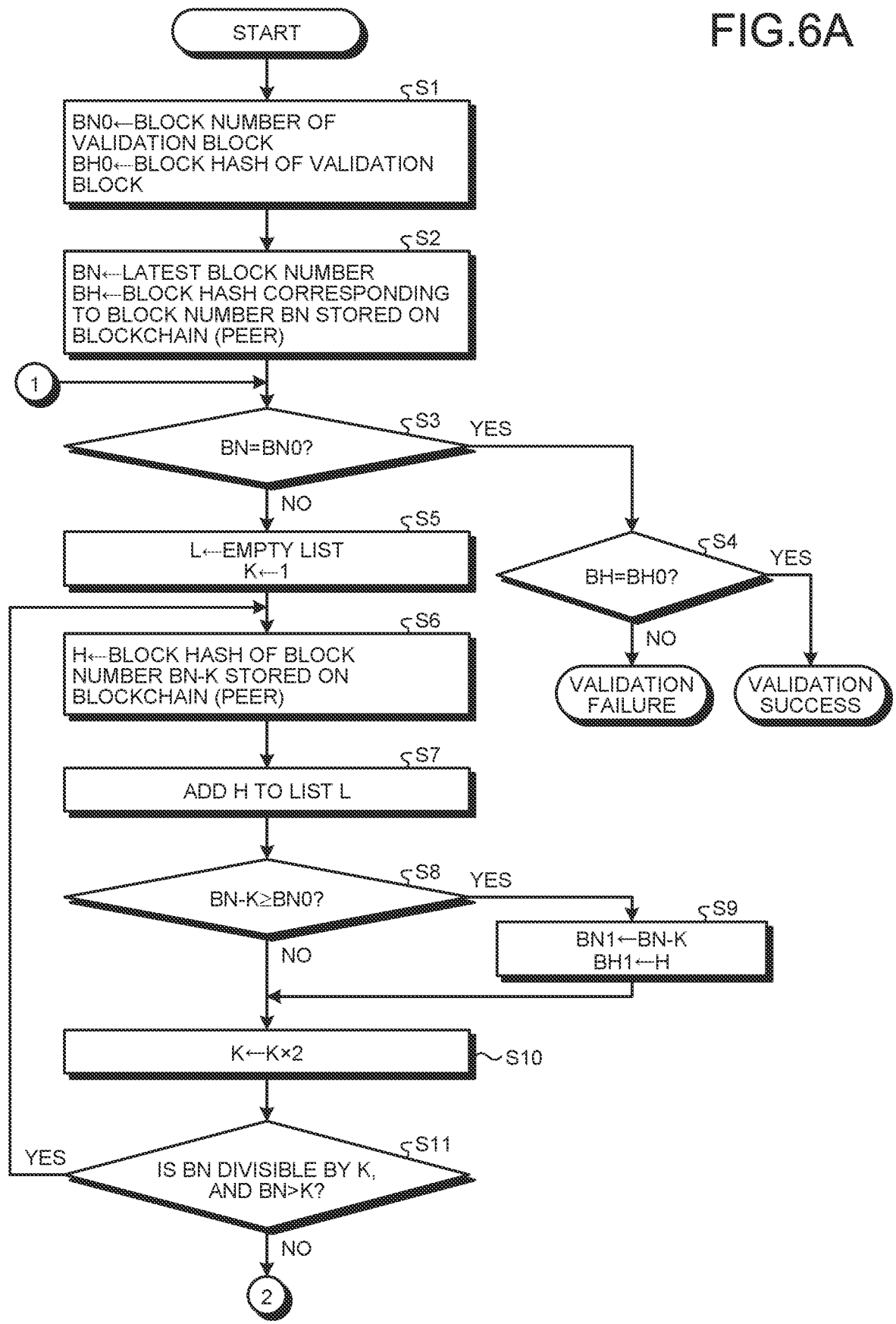
FIG. 6A is a flowchart illustrating an example of the tampering validation method according to the first embodiment.
Figure 6B:
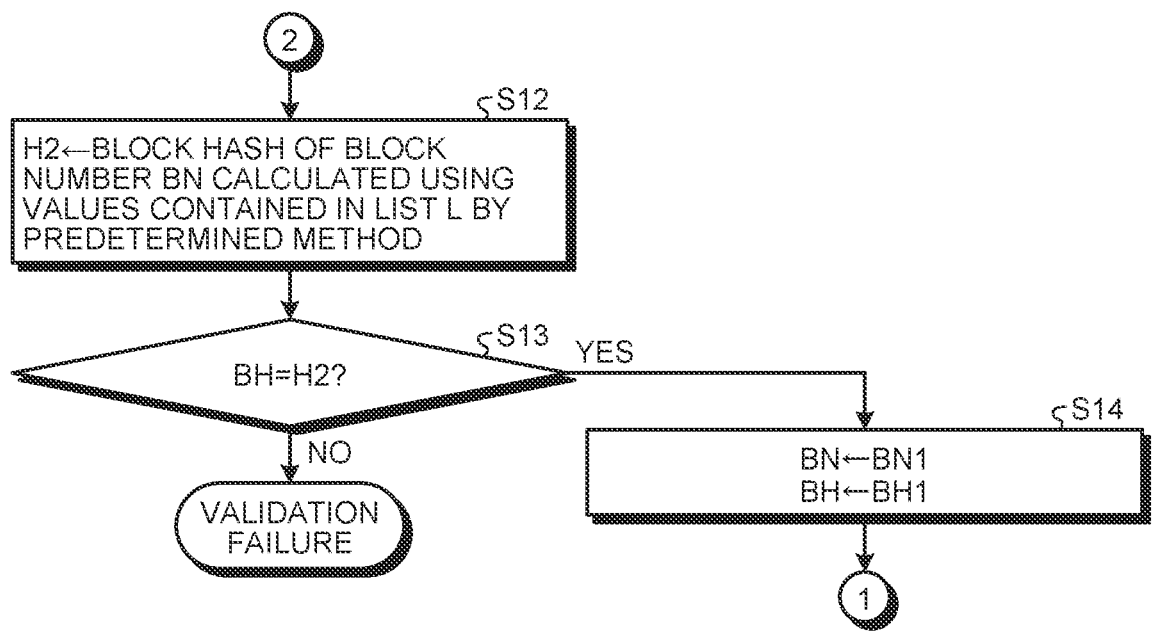
FIG. 6B is a flowchart illustrating the example of the tampering validation method according to the first embodiment.

FIGS. 6A and 6B are flowcharts illustrating an example of the tampering validation method according to the first embodiment. The flowchart of FIGS. 6A and 6B illustrate an example of a flowchart for implementing the tampering validation method of FIG. 5 described above. The process of the flowcharts of FIGS. 6A and 6B is performed by the first validation unit 13.

First, the first validation unit 13 sets the block number of the validation block to BN0 and sets the block hash of the validation block to BH0 (Step S1).

Next, the first validation unit 13 sets the latest block number to BN and sets the block hash of the latest block number stored on the blockchain (peer 10) to BH (Step S2).

Next, the first validation unit 13 determines whether BN=BN0 (Step S3).

When BN=BN0 (Step S3, Yes), it is determined whether BH=BH0 (Step S4). When BH=BH0 (Step S4, Yes), the first validation unit 13 determines validation success and finishes the process. When BH≠BH0 (Step S4, No), the first validation unit 13 determines validation failure and finishes the process.

When BN≠BN0 (Step S3, No), the first validation unit 13 sets an empty list to L, and sets 1 to K (Step S5). Next, the first validation unit 13 sets the block hash of the block number BN−K stored on the blockchain (peer 10) to H (Step S6). Next, the first validation unit 13 adds H to the list L (Step S7).

Next, the first validation unit 13 determines whether BN−K≥BN0 (Step S8). In the case of BN−K≥BN0 (Step S8, Yes), the first validation unit 13 sets BN−K to BN1, sets H to BH1 (Step S9), and proceeds to Step S10. In the case of not being BN−K≥BN0 (Step S8, No), the process proceeds to Step S10 without performing the processing of Step S9.

Next, the first validation unit 13 doubles the value of K (Step S10). Then, the first validation unit 13 determines whether BN is divisible by K and BN>K (Step S11). When BN is divisible by K and BN>K (Step S11, Yes), the process returns to Step S6.

When BN is not divisible by K or in the case of not being BN>K (Step S11, No), the first validation unit 13 sets, to H2, the block hash of the block number BN calculated using values contained in the list L by a predetermined method (Step S12).

Next, the first validation unit 13 determines whether BH=H2 (Step S13). In the case of BH≠H2 (Step S13, No), the first validation unit 13 determines validation failure and finishes the process. In the case of BH=H2 (Step S13, Yes), the first validation unit 13 sets BN1 to BN, BH1 to BH, and returns to the processing of Step S3.

Upon validation success, the first validation unit creates a certificate that includes all of the unique information about the recalculation blocks, the block hashes of the recalculation blocks, and other block hashes used for calculation of the block hashes of the recalculation blocks, which are referred to upon performance of the flowchart.

When receiving the certificate, the second validation unit performs the process of the flowcharts illustrated in FIGS. 6A and 6B. At this time, the block hash used for the calculation is obtained from the above-mentioned certificate transmitted from the peer 10. In other words, upon validation success, the first validation unit and the second validation unit perform exactly the same calculation.

As described above, in the tampering validation system 100 according to the first embodiment, the generation unit 11 calculates the block hash on the basis of other block hashes of a plurality of other blocks and the unique information, and generates the blockchain to which the block containing the calculated block hash is connected. When receiving the validation request for the validation block contained in the blockchain, the first validation unit 13 generates the certificate used for recalculation of the recalculation blocks containing the block hashes that are dependent on the block hash of the validation block, for other block hashes used for hash calculation. Then, when receiving the certificate, the second validation unit 21 validates the validation block by recalculating the block hashes of the recalculation blocks using the certificate.

Therefore, according to the tampering validation system 100 according to the first embodiment, a blockchain validation time can be further reduced.

In the conventional blockchain, adjacent blocks are "chained" by taking in the block hash of the previous block, in the calculation of the block hash. The recalculation by tracing the chain of the connections yields a mechanism for enabling non-tempering of the block hash to be validated.

In the configuration of the first embodiment, the block hash of a block that is not necessarily the previous block is also taken into the calculation for the block hash, enabling "chaining" the blocks that are not adjacent to each other. The recalculation performed by tracking the chain of the blocks that are away from each other enables skipping of the recalculation of the block hashes of the blocks positioned therebetween.

Therefore, in the blockchain adopting the data structure according to the first embodiment allows high-speed validation for non-tempering. Note that even in the first embodiment, it is still possible to perform validation along the adjacent chains, similarly to conventional blockchain. In other words, the validation method is not limited to one method.

Selection of the validation chain by the tampering validation method according to the first embodiment makes it possible to significantly reduce the validation time. The reduction effect increases as a block to be validated and a block not tampered with that is the base of the validation are away from each other.

Specifically, the validation time can be evaluated by the number of times of calculation for the block hash and the number of other block hashes referred to. In the case of the conventional art, in order to validate blocks that are away from each other by 100,000 blocks, it is necessary to calculate the block hashes 100,000 times and refer to 100,000 other block hashes.

On the other hand, in the first embodiment, it is only necessary to calculate the block hashes approximately 16.5 times on average and refer to approximately 154 other block hashes on average. When the blocks are away from each other by 1 million blocks, it is only necessary to calculate the block hashes approximately 20 times on average and refer to approximately 219 other block hashes on average. In other words, the average number of times of recalculation of the block hashes for the validation is 20, the average number of other block hashes transferred from the peer 10 to perform the validation outside (validation device 20) the peer 10 is 219, and the average number of recalculation blocks transferred for the validation by the validation device 20 is 20.

Second Embodiment

Next, a second embodiment will be described. In the second embodiment, a description similar to that in the first embodiment will be omitted, and portions different from those of the first embodiment will be described.

In the second embodiment, the set S(BN) described above is defined as follows.

When BN is an odd number, S(BN)={BN−1}∩N.

When BN is an even number and BN is a number that is divisible by $2^n$ but not divisible by $2^{(n+1)}$, $$S(BN)=\{BN-1, BN-2^n\} \cap N.$$

In the first embodiment described above, the higher the block number of a block is, the more other blocks the block may be connected to. Meanwhile, in the second embodiment, the maximum two other blocks are connected to one block.

FIG. 7 is a diagram illustrating a connection example of a blockchain according to the second embodiment. For example, block #24 is connected to block #16 and block #23 because S(BN=24)={16,23}.

Figure 8A:
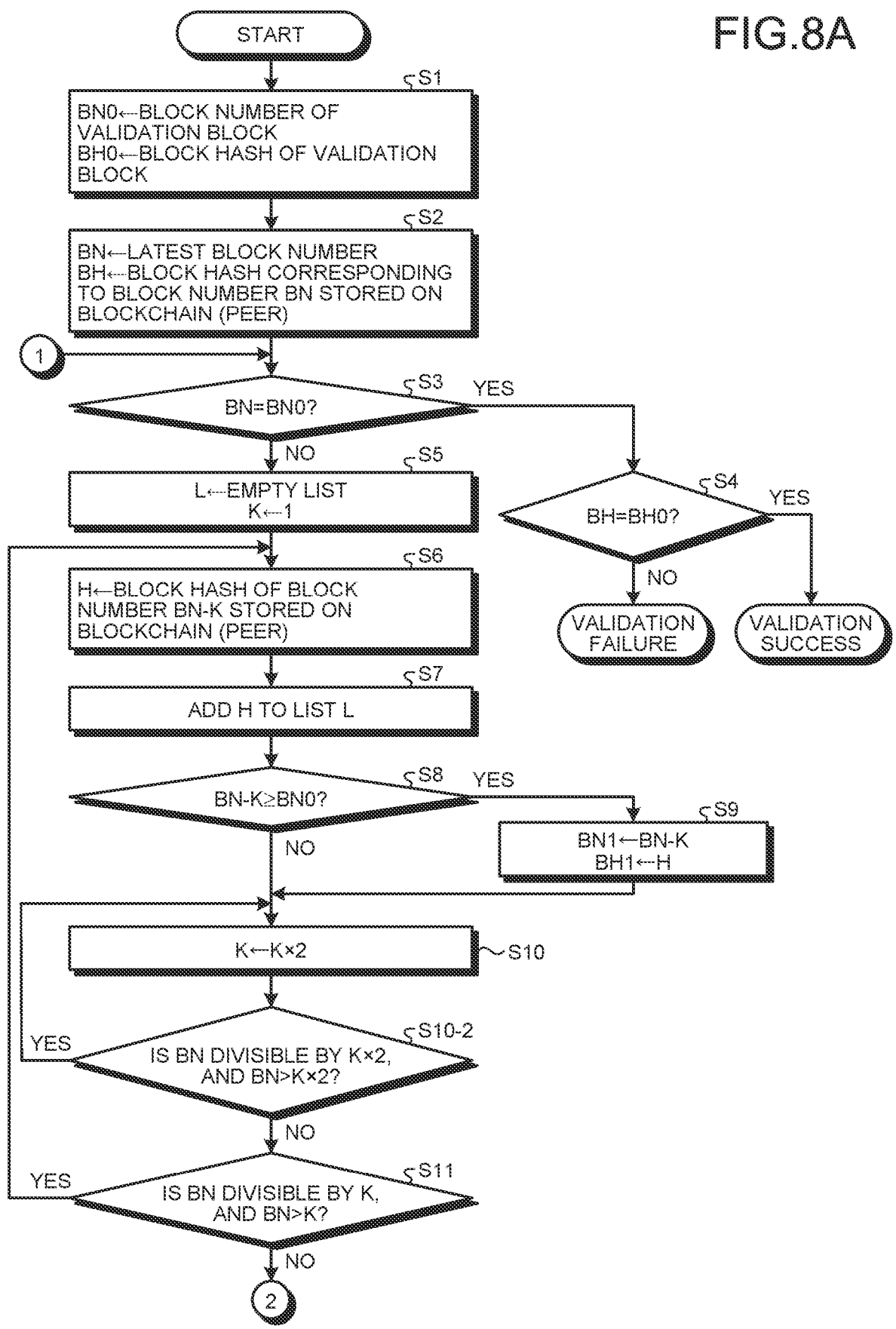
FIG. 8A is a flowchart illustrating an example of a tampering validation method according to the second embodiment.
Figure 8B:
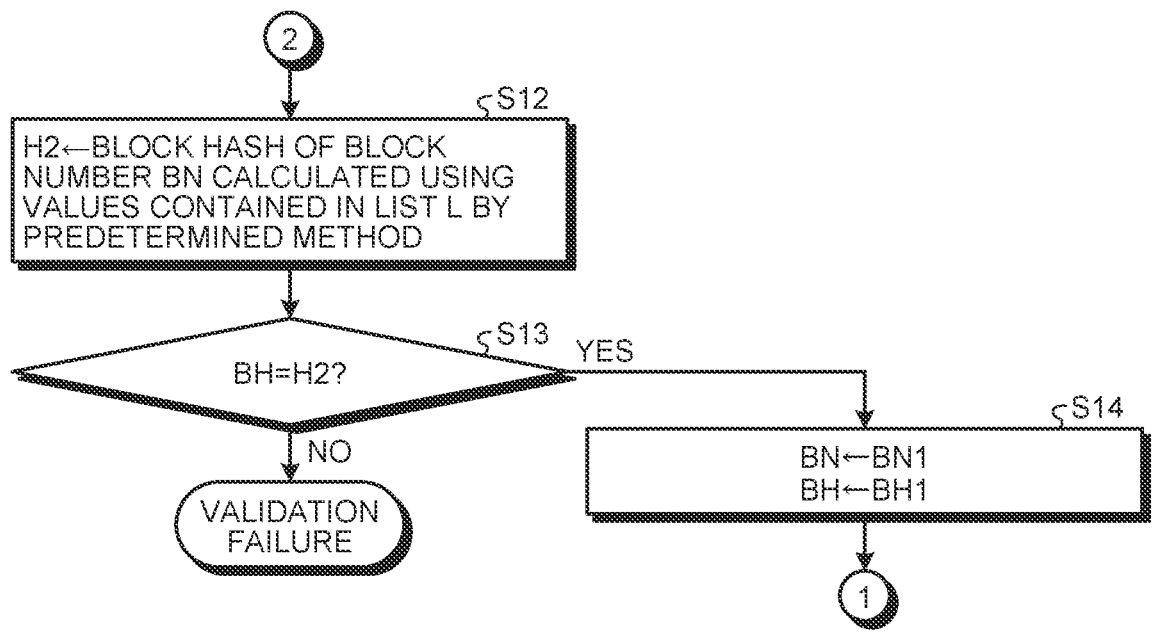
FIG. 8B is a flowchart illustrating the example of the tampering validation method according to the second embodiment.

FIGS. 8A and 8B are flowcharts illustrating an example of a tampering validation method according to the second embodiment. The tampering validation method of the second embodiment is different from that of the first embodiment in that Step S10-2 is added.

The description of Steps S1 to S10 is the same as the description of FIG. 6A in the first embodiment, and thus the description thereof will be omitted. Next, the second validation unit 21 determines whether BN is divisible by K×2 and BN>K×2 (Step S10-2). When BN is divisible by K×2 and in the case of BN>K×2 (Step S10-2, Yes), the process returns to Step S10. When BN is not divisible by K×2 or in the case of BN>K×2 (Step S10-2, No), the process proceeds to Step S11. Steps S11 to S14 are the same as those of FIGS. 6A and 6B in the first embodiment, and the description thereof will be omitted.

According to the second embodiment, the maximum number of block hashes (other block hashes) of the past blocks taken in calculation for the block hash of the validation block is limited to 2, making implementation easier than in the first embodiment. The second embodiment, in order to validate the validation block located before the last one million blocks, it is only necessary to calculate the block hashes approximately 114 times on average and refer to approximately 214 other block hashes on average.

Third Embodiment

Next, a third embodiment will be described. In the third embodiment, a description similar to that in the first embodiment will be omitted, and portions different from those of the first embodiment will be described.

In the third embodiment, the set S(BN) described above is defined as follows.

When BN is an odd number, S(BN)={BN−1}∩N.

BN is a number that is divisible by $2^n$ but not divisible by $2^{(n+1)}$.

In the case of n≤4, S(BN)={BN−1, BN−$2^n$}∩N (connection to the previous block and a block located before the last $2^n$ blocks)

In the case of n≥5, S(BN)={BN−1, BN−$2^{n-p}$, BN−$2^{n-q}$, BN−$2^n$}∩N (connection to the previous block, a block located before the last $2^{n-p}$ blocks, a block located before the last $2^{n-q}$ blocks, and a block located before the last $2^n$ blocks)

p=ceil(sqrt(n)); ceil(x) is the smallest integer equal to or larger than x, and sqrt(x) is the positive square root of x q=floor(sqrt(sqrt(n))); floor(x) is the largest integer not exceeding x However, the block number=0 is excluded from the calculation.

According to the third embodiment, in order to validate the validation block located before the last one million blocks, it is only necessary to calculate the block hashes approximately 31 times on average and refer to approximately 98 other block hashes on average.

Fourth Embodiment

Next, the fourth embodiment will be described. In the fourth embodiment, a description similar to that in the first embodiment will be omitted, and portions different from those of the first embodiment will be described.

In the fourth embodiment, the generation unit 11 calculates the hash value of the transaction records for the transaction contents (transaction records), and calculates the block hash by using the hash value.

When tampering with the block hashes is suspected, it can be considered that the peer 10 itself may have already been disabled from the beginning, and validation in the peer 10 may be meaningless. Therefore, it is desirable to perform validation for non-tempering with a computer (validation device 20 in the example of FIG. 1) independent of the peer 10. Recalculation of the block hashes on another computer requires reading other block hashes related to the block hash of the validation block from the peer 10.

The certificate stores other block hashes and the unique information (e.g., the hash value of the transaction records, the block number, etc.) contained in the recalculation block for recalculation of the block hash, in a predetermined order. The certificate can be obtained by making a request to the peer 10. The certificate contains all the data used for validation, and recalculation of the block hash performed by an external computer according to the certificate enables validation for non-tempering. The certificate according to the fourth embodiment does not contain the raw transaction records (transaction contents), thus, effectively preventing leakage of information recorded on the blockchain from the certificate.

Fifth Embodiment

Next, a fifth embodiment will be described. In the fifth embodiment, a description similar to that in the first embodiment will be omitted, and portions different from those of the first embodiment will be described.

The fifth embodiment describes about cases for which the above first to fourth embodiments are further generalized. In the fifth embodiment, the set S(BN) of predetermined other block numbers is determined for each block number BN. Here, b∈S(BN) satisfies b<BN. BN−1∈S(BN) needs to be satisfied (excluding BN having the initial number).

The block hash of the block having the block number BN is calculated by a predetermined method, based on a set of the block hashes of the blocks each having the block number b∈S(BN), and the transactions and the like contained in the block. At this time, the validation method, for example, as illustrated in FIGS. 9A and 9B is used.

Figure 9A:
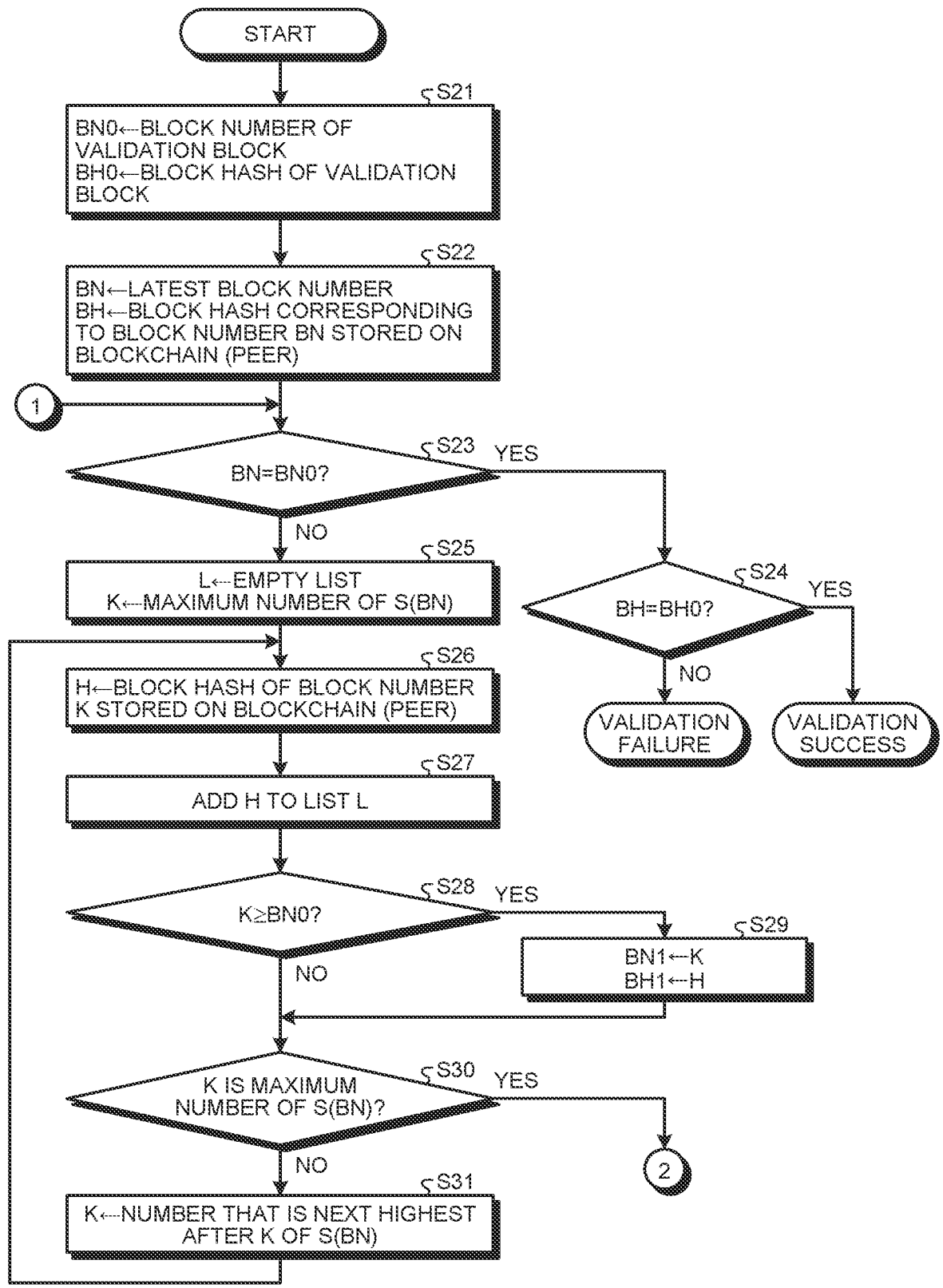
FIG. 9A is a flowchart illustrating an example of a tampering validation method according to a fifth embodiment.
Figure 9B:
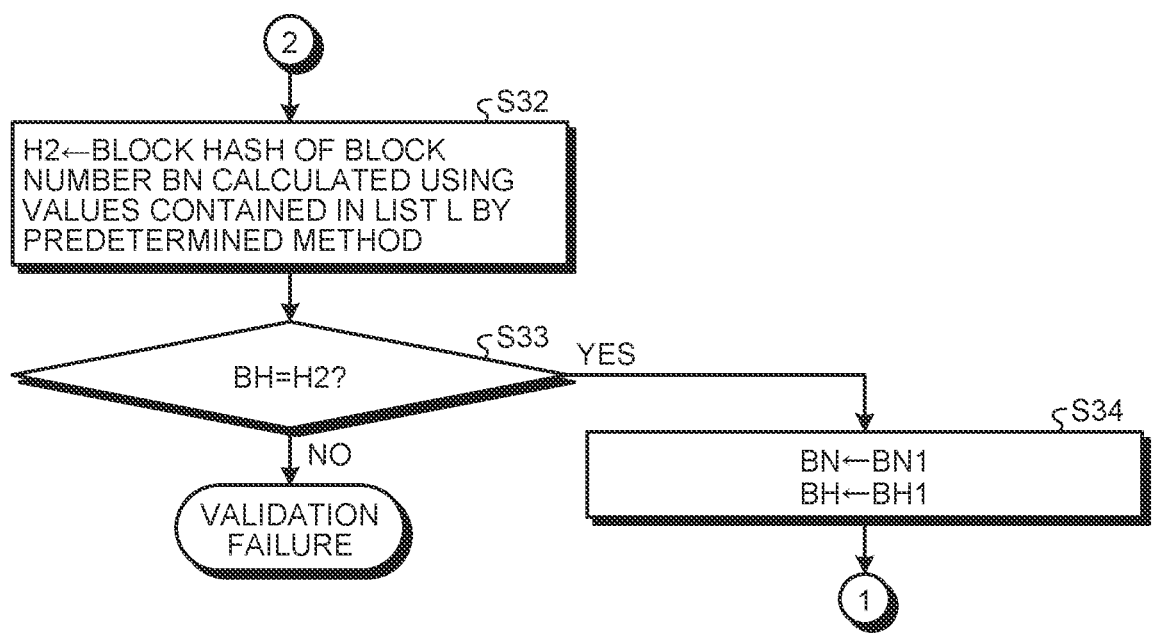
FIG. 9B is a flowchart illustrating the example of the tampering validation method according to the fifth embodiment.

FIGS. 9A and 9B are flowcharts illustrating an example of the tampering validation method according to the fifth embodiment. Steps S21 to S24 are the same as Steps S1 to S4 of the first embodiment described above, and the description thereof will be omitted.

The second validation unit 21 sets an empty list to L, and sets a maximum number of S(BN) to K (Step S25). Next, the second validation unit 21 sets the block hash of a block number K stored on the blockchain (peer 10) to H (Step S26). Next, the second validation unit 21 adds H to the list L (Step S27).

Next, the second validation unit 21 determines whether K≥BN0 (Step S28). In the case of K≥BN0 (Step S28, Yes), the second validation unit 21 sets K to BN1, sets H to BH1 (Step S29), and proceeds to Step S30. In the case of K<BN0 (Step S28, No), the process proceeds to Step S30 without performing the processing of Step S29.

Next, the second validation unit 21 determines whether K is a minimum number of S(BN) (Step S30). When K is not the minimum number of S(BN) (Step S30, Yes), the second validation unit 21 sets a number that is the next highest after K of S(BN) to K (Step S31), and returns to Step S26.

When K is the minimum number of S(BN) (Step S30, Yes), the process proceeds to Step S32. Steps S32 to S34 are the same as Steps S12 to S14 of the first embodiment described above, and the description thereof will be omitted.

As described above, according to the fifth embodiment, even when the set S(BN) of other block numbers is generalized, the blockchain validation time can be further reduced as in the first embodiment.

Finally, an example of a hardware configuration of the peer 10 and the validation device 20 according to the first to fifth embodiments will be described.

Example of Hardware Configuration

Figure 10:
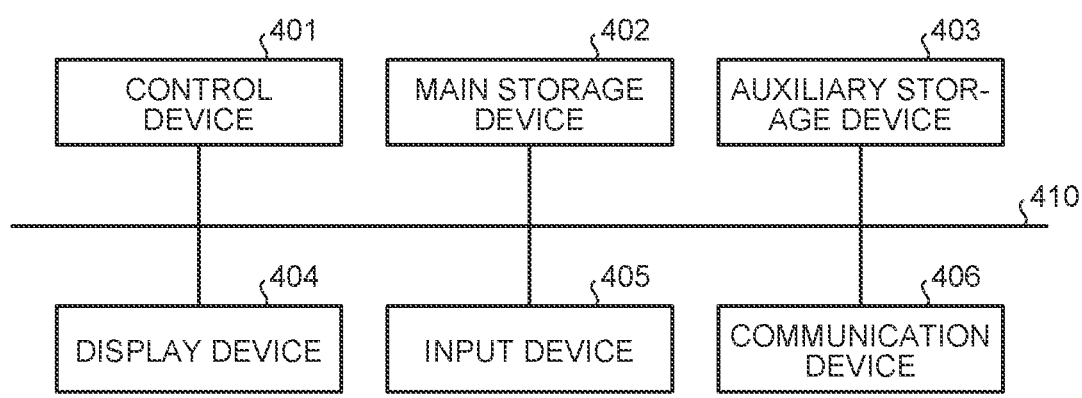
FIG. 10 is a diagram illustrating an example of a hardware configuration of a peer and a validation device according to the first to fifth embodiments.

FIG. 10 is a diagram illustrating an example of the hardware configuration of the peer 10 and the validation device 20 according to the first to fifth embodiments. Each of the peer 10 and the validation device 20 includes a control device 401, a main storage device 402, an auxiliary storage device 403, a display device 404, an input device 405, and a communication device 406. The control device 401, the main storage device 402, the auxiliary storage device 403, the display device 404, the input device 405, and the communication device 406 are connected via a bus 410.

The control device 401 executes a program read from the auxiliary storage device 403 into the main storage device 402. The main storage device 402 is a memory such as a read only memory (ROM) and a random access memory (RAM). The auxiliary storage device 403 is a hard disk drive (HDD), a memory card, and the like.

The display device 404 displays information. The display device 404 is, for example, a liquid crystal display or the like. The input device 405 is an interface that receives an input. The input device 405 is, for example, a keyboard and a mouse. The display device 404 and the input device 405 may be a touch panel and the like having a display function and an input function. The communication device 406 is an interface for communication with another device.

The program executed by the peer 10 and the validation device 20 is recorded in a computer-readable storage medium, such as CD-ROM, a memory card, CD-R, or DVD, in an installable or executable format file, and is provided as a computer program product.

Furthermore, the program executed by the peer 10 and the validation device 20 may be configured to be stored on a computer connected to a network such as the Internet and provided by being downloaded via the network. Furthermore, the program executed by the peer 10 and the validation device 20 may be configured to be provided via the network such as the Internet without being downloaded.

Furthermore, the program for the peer 10 and the validation device 20 may be configured to be provided by being incorporated into a ROM or the like in advance.

The program executed by the peer 10 and the validation device 20 has a module configuration that includes a functional block of the functional blocks of FIG. 1 described above, the functional block being configured to be implemented by the program as well. In terms of actual hardware, each of the functional blocks is loaded on the main storage device 402 in response to execution of a program read from the recording medium by the control device 401. In other words, each of the above functional blocks is generated on the main storage device 402.

Note that some or all of the functional blocks of FIG. 1 described above may be implemented by hardware such as IC without being implemented by software.

Furthermore, when functions are implemented by using a plurality of processors, each processor may implement one of the functions, or may implement two or more of the functions.

Furthermore, any operation mode may be adopted for the operation mode of the peer 10 and the validation device 20. The peer 10 and the validation device 20 may be operated, for example, as a device constituting a cloud system on a network.

While certain embodiments have been described, these embodiments have been presented by way of example only, and are not intended to limit the scope of the inventions. Indeed, the novel methods and systems described herein may be embodied in a variety of other forms, and furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A tampering validation method comprising:
   calculating a block hash based on other block hashes of a plurality of other blocks, including at least one block that is not adjacent to the block, and unique information, and generating a blockchain to which a block containing the calculated block hash is connected;
   in response to reception of a validation request for a validation block contained in the blockchain, generating a certificate used for recalculation of recalculation blocks containing block hashes that are dependent on a block hash of the validation block, for the other block hashes; and
   in response to reception of the certificate, validating the validation block by recalculating block hashes of the recalculation blocks using the certificate, wherein
   the other block hashes of the plurality of other blocks are identified by a set of other block numbers determined by using a predetermined equation that includes variables expressed by the block numbers of blocks connected, and
   when BN is a block number, N is a set of all natural numbers, and n is an integer indicating that the BN is divisible by $2^n$ but not divisible by $2^{(n+1)}$, the set of other block numbers is define by:
   $S(BN) = \{BN-1\} \cap N$, when the BN is an odd number; and $S(BN)=\{BN-2^m | m$ is an integer that satisfies $0 \leq m \leq n\} \cap N$, when the BN is an even number.

2. The tampering validation method according to claim 1, wherein the certificate contains unique information about the recalculation blocks, the block hashes of the recalculation blocks, and the other block hashes used for calculation of the block hashes of the recalculation blocks.

3. The tampering validation method according to claim 1, wherein the unique information includes at least one of information based on transaction records and a block number.

4. The tampering validatio nmethod according to claim 1, wherein the validating includes skipping recalculatio nof a block hash of any block not contained in the recalculation blocks.

5. The tampering validation method according to claim 3, wherein the information based on transaction records represents the transaction records or a hash value of the transaction records.

6. A tampering validation method comprising:
calculating a block hash for a block based on other block hashes of a plurality of other blocks, including at least one block that is not adjacent to the block, and unique information, and generating a blockchain to which the block containing the block hash is connected;
in response to reception of a validation request for a validation block contained in the blockchain, generating a certificate used for recalculation of recalculation blocks containing block hashes that are dependent on a block hash of the validation block, for the other block hashes; and
in response to reception of the certificate, validating the validation block by recalculating block hashes of the recalculation blocks using the certificate, wherein
the other block hashes of the plurality of other blocks are identified by a set of other block numbers determined by using a predetermined equation that includes variables expressed by block number of blocks connected, and
when BN is a block number, N is a set of all natural numbers, and n is an integer indicating that the BN is divisible by $2^n$ but not divisible by $2^{(n+1)}$, the set of other block numbers is defined by:
$S(BN)=\{BN-1\} \cap N$, when BN is an odd number; and
$S(BN)=\{BN-1, BN-2^n\} \cap N$, when BN is an even number.

7. A tampering validation method comprising:
calculating a block hash for a block based on other block hashes of a plurality of other blocks, including at least one block that is not adjacent to the block, and unique information, and generating a blockchain to which the block containing the block hash is connected;
in response to reception of a validation request for a validation block contained in the blockchain, generating a certificate used for recalculation of recalculation blocks containing block hashes that are dependent on a block hash of the validation block, for the other block hashes; and
in response to reception of the certificate, validating the validation block by recalculating block hashes of the recalculation blocks using the certificate, wherein
the other block hashes of the plurality of other blocks are identified by a set of other block numbers determined by using a predetermined equation that includes variables expressed by block numbers of blocks connected, and
when BN is a block number, N is a set of all natural numbers, n is an integer indicating that the BN is divisible by $2^n$ but not divisible by $2^{(n+1)}$, p=ceil(sqrt(n)) (ceil(x) is a smallest integer equal to or larger than x, and sqrt(x) is the positive square root of x), and q=floor(sqrt(sqrt(n))) (floor(x) is the largest integer not exceeding x), the set of other block numbers is defined by:
$S(BN)=\{BN-1\} \cap N$, when BN is an odd number;
$S(BN)=\{BN-1, BN-2^n\} \cap N$, when $n \leq 4$; and
$S(BN)=\{BN-1, BN-2^{n-p}, BN-2^{n-q}, BN-2^n\} \cap N$, when $n \geq 5$.

8. A tampering validation system comprising:
one or more hardware processors configured to function as:
a generation unit that calculates a block hash based on other block hashes of a plurality of other blocks, including at least one block that is not adjacent to the block, and unique information, and generates a blockchain to which the block containing the calculated block hash is connected;
a first validation unit that, in response to receiving a validation request for a validation block contained in the blockchain, generates a certificate used for recalculation of recalculation blocks containing block hashes that are dependent on a block hash of the validation block, for the other block hashes; and
a second validation unit that, in response to reception of the certificate, validates the validation block by recalculating block hashes of the recalculation blocks using the certificate, wherein
the other block hashes of the plurality of other blocks are identified by a set of other block numbers determined by using a predetermined equation that includes variables expressed by block numbers of blocks connected, and
when BN is a block number, N is a set of all natural numbers, and n is an integer indicating that the BN is divisible by $2^n$ but not divisible by $2^{(n+1)}$, the set of other block numbers is defined by:
$S(BN)=\{BN-1\} \cap N$, when the BN is an odd number; and
$S(BN)=\{BN-2^m | m$ is an integer that satisfies $0 \leq m \leq n\} \cap N$,
when the BN is an even number.

9. The tampering validatio nsystem according to claim 8, wherein the second validatio nunit skips recalculation of a block hash of any block not contained in the recalculation blocks.

* * * * *